Patented June 12, 1945

2,377,866

UNITED STATES PATENT OFFICE 2,377,866

AMINOPLASTS HAVING INTERCONDENSED THEREIN A PARTIAL AMIDE OF A POLYCARBOXYLIC ACID

Gaetano F. D'Alelio, Pittsfield, Mass., assignor to General Electric Company, a corporation of New York No Drawing. Application August 2, 1940,
Serial No. 350,133

21 Claims. (Cl. 260—42)

This invention relates to the production of new materials, specifically condensation products, having valuable and characteristic properties that make them especially suitable for use in industry, for example in casting, molding, laminating, coating and adhesive applications, and for other purposes. The invention is concerned more particularly with compositions of matter comprising heat-convertible (heat-curable) and heat-converted (heat-cured) aminoplasts having intercondensed therein a simple, partial amide of a polycarboxylic acid that contains at least three and not more than fifteen carbon atoms, said partial amide containing a —COOH radical and an amide radical having a hydrogen atom attached directly to the amide nitrogen. Illustrative of such amide radicals are those which may be represented by the formula

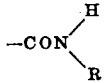

where R represents hydrogen, or alkyl, aryl (including naphthyl), aralkyl, alkaryl, acyl, hydrocyclic, heterocyclic, etc., radicals, or nitro, halogeno, aceto, carboalkoxy, acetoxy, etc., derivatives of such radicals. For purpose of brevity these amide derivatives of polycarboxylic acids are designed generally herein as "semi-amides of polycarboxylic acids that contain at least three carbon atoms" or, merely, as "semi-amides."

The present application is a continuation-in-part of my copending application Serial No. 326,056, filed March 26, 1940, now Patent 2,260,006, issued October 21, 1941, which latter application in turn is a continuation-in-part of my copending applications Serial No. 159,465, filed October 16, 1937, now Patent No. 2,239,440, Serial No. 289,435, filed August 10, 1939, now Patent No. 2,290,675, issued July 21, 1942, and Serial No. 318,956, filed February 14, 1940, now Patent No. 2,290,674, issued July 21, 1942.

In application Serial No. 326,056 I disclosed and claimed compositions comprising a resinous product of reaction of a phenol, an aliphatic aldehyde and one of the above described semi-amides. I showed in that application that such compositions are particularly useful in the plastics and coating arts as casting resins, oil-soluble resins, molding compositions, etc. By intercondensing acid (—COOH) amides of a polycarboxylic acid that contains at least three carbon atoms with a phenol and an aliphatic aldehyde, products of improved color and light stability are obtained as compared with products similarly made in the absence of the semi-amide. Further, the introduction of the —COOH radical facilities the conversion of the intermediate condensation product from a soluble, fusible state to an insoluble, infusible state.

The present invention is based on my discovery that thermosetting aminoplasts can be prepared by effecting reaction between the components of a mass comprising an amino or an amido compound (amidogen compound), e. g., aminotriazines, for instance, diaminotriazines such as ammeline, triaminotriazines such as melamine, etc., urea, thiourea, etc. (or mixtures thereof), an aliphatic aldehyde, e. g., formaldehyde, and a derivative of a polycarboxylic acid containing at least one —COOH radical and at least one amide radical having at least one hydrogen atom attached directly to the amide nitrogen. The present invention thus provides potentially reactive (heat-convertible) aminoplasts and molding compositions that require no additional curing accelerator of the admixed-catalyst type, or other curing reactant, in order to obtain technically useful products. Such aminoplasts have intercondensed therein the partial amide of the polycarboxylic acid and may be termed "self-curing aminoplasts."

I am aware that the broad suggestion has been made heretofore that resinous compositions may be obtained by condensing formaldehyde or its polymers with polyamides of polycarboxylic acids, more particularly those containing more than four carbon atoms, e. g., polyamides of adipic acid, suberic acid, phthalic acid, etc. However, to the best of my knowledge and belief, resinous compositions heretofore have not been prepared by condensing an aliphatic aldehyde with a monomeric monoacid monoamide or polyamide, or with a monomeric polyacid monoamide, of a polycarboxylic acid containing at least three carbon atoms. Likewise, to the best of my knowledge and belief, it was not known nor appreciated prior to my invention that particularly useful, relatively inexpensive resins of rapid curing characteristics and of good color and color stability could be obtained by intercondensing a plurality of compounds including an amino or an amido compound, an aliphatic aldehyde and at least one of the hereindescribed semi-amides; or, by intercondensing such semi-amide (or a partial condensation product, e. g., a methylol derivative of such semi-amide and an aliphatic aldehyde, e. g., formaldehyde) with a partial condensation product, e. g., a methylol derivative, of an amino or an amido compound and an aliphatic aldehyde.

As is well known, aminoplasts are synthetic resins derived from amino or amido compounds, a typical example being urea-formaldehyde resin (reference: Modern Plastics, vol. 17, No. 2, October, 1939, page 433). In the production of aminoplasts it has heretofore been common practice in converting such materials to the insoluble, infusible state to incorporate into the condensation product or into the molding composition a latent or an active (direct) curing catalyst. As pointed out more particularly hereafter, this technique and the final products have not been entirely satisfactory.

In the heat-convertible resinous condensation products of this invention the curing property of the product is imparted thereto by creating a resin molecule having this inherent characteristic. Such resins may be said to be "self curing" under heat, since the whole resin molecule including the curing reactant that is an integral part thereof cures (hardens) to an insoluble, infusible state. This is a discovery of great practical significance. It makes possible the production of molding compositions of uniform curing characteristics, which compositions yield molded articles free from imperfections, such as blisters, discoloration, etc. Such imperfections are due usually to localized curing that often occurs in resinous materials of the admixed-catalyst type. As the value of the molded article, especially light-colored articles, is materially influenced by its appearance, it is clear that the discovery of any means for decreasing or eliminating entirely the production of imperfect articles which must be scrapped or sold at reduced price is of considerable commercial importance.

As a result of my invention the difficulties attendant the product of molding compositions comprising aminoplasts of the admixed-catalyst type are avoided. With such compositions there was, despite the most careful precautions, considerable variation in the curing rates of the individual batches. This made difficult the maintenance of production schedules. Considerable variation also was common even among different portions of the same batch of materials, as evidenced by the appearance of the cured article.

The resin syrups and molding compositions of this invention may be stored for long periods of time without material alteration. In marked contrast therewith the prior heat-convertible aminoplasts, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Further, the molding compgositions of this invention cure rapidly under heat or under heat and pressure and have good plastic flow during molding. Hence molded articles of even the most complicated designs can be produced rapidly and economically. Particularly good results from the standpoint of flow characteristics of the resins and molding compositions may be obtained by using monomeric semi-amides of polycarboxylic acids that contain at least eight carbon atoms, that is, monomeric semi-amides of polycarboxylic acids having at least six carbon atoms in excess of the carbon atoms in the —COOH and the amide groups. Examples of semi-amides that may be used in practicing the present invention are the semi-amides of saturated and unsaturated aliphatic polycarboxylic acids containing at least three and not more than fifteen carbon atoms, more particularly from six to fifteen carbon atoms, e. g., the monoamide of adipic acid, etc., and the semi-amides of aromatic polycarboxylic acids, e. g., the monoamide of phthalic acid.

The cured (heat-hardened) aminoplasts of this invention have good color and color stability, excellent water resistance and surface finish and, in general, meet the strength, hardness and other requirements of the particular service application.

In producing my new condensation products, which may be described more particularly as co-condensation or inter-condensation products, the choice of the aliphatic aldehyde component is dependent largely upon economic considerations and upon the particular properties desired in the finished product. I prefer to use as the aldehyde reactant formaldehyde or compounds engendering formaldehyde, e. g., paraformaldehyde, hexamethylene tetramine, etc. For some applications I may use, for instance, acetaldehyde, propionaldehyde, butyraldehyde, acrolein, methacrolein, crotonaldehyde, etc., mixtures thereof, or mixtures of formaldehyde (or compounds engendering formaldehyde) with such aliphatic aldehydes. In general, the longer the chain of the aliphatic aldehyde, the slower the cure of the resinous condensation product and the softer the final product.

The amidogen (amido or amino) component may be, for instance, urea, thiourea, diurea, diethylene triurea, methyl urea, acetyl urea, benzoyl urea, phenyl thiourea, asymmetrical diethyl urea, allyl urea, 2-chloroallyl urea, ethylidene urea, methylol urea, methylene urea, guanidine, dicyandiamide, guanylurea, guanylthiourea, biguanide, aminoguanidine, guanoline, etc., or suitable mixtures of such compounds. The terms "a urea" and "urea substance" as used generally herein and in the appended claims are intended to include within their meaning substances of the kind above mentioned. Other examples of amidogen compounds that may be employed are the aminotriazines (e. g., melamine, ammeline, etc.) and creatinine.

Any derivative of a polycarboxylic acid (dicarboxylic acids, tricarboxylic acids, etc.) that contains more than two carbon atoms, more particularly from three to fifteen carbon atoms, which derivative contains at least one —COOH radical and at least one aldehyde-reactable amide radical, that is, an amide radical containing at least one hydrogen atom attached directly to the amide nitrogen, may be used in producing the new condensation products of this invention. Examples of such amides are the monoamides of the saturated aliphatic polycarboxylic acids containing at least three carbon atoms, e. g., malonic, succinic, glutaric, adipic, pimelic, suberic, sebacic, azelaic, tricarballylic, malic, tartaric, citric, etc.; the monoamides of the cyclic polycarboxylic acids such as the cyclopropane dicarboxylic acids, the cylohexane dicarboxylic acids, the alkyl cycloalkane polycarboxylic acids, etc.; the monoamides of the halogenated and non-halogenated aromatic polycarboxylic acids, e. g., halogenated and non-halogenated phthalic, benzoyl phthalic, terephthalic, benzophenone-2,4'-dicarboxylic acids, etc.; the monoamides of the alpha unsaturated alpha beta polycarboxylic acids, e. g., maleic, monohalomaleic, fumaric, monohalofumaric, citraconic, mesaconic, acetylene dicarboxylic, aconitic, itaconic and its homologues as, for instance, alpha-methyl itaconic acid, alpha-ethyl itaconic acid, etc.

More specific examples of the semi-amides that may be employed in carrying the present invention into effect are the monoacid N-methyl, -ethyl, -propyl, -butyl, -isobutyl, -hexyl, -phenyl, -benzyl, -cinnamyl, -naphthyl, -cresyl, -furfuryl, -allyl, -methallyl, -crotonyl, -cyclohexyl, -aceto, etc., monoamides of malonic, succinic, adipic, maleic, fumaric and other saturated and unsaturated polycarboxylic acids containing at least three carbon atoms, numerous examples of which are given above. Thus I may use any monoacid N-alkyl, -aryl, -aralkyl, -alkaryl, -acyl, -hydrocarbocyclic or -heterocyclic (or a nitro, halogeno, aceto, carboalkoxy or acetoxy derivative of the said radicals) monoamide of any polycarboxylic acid containing at least three carbon atoms. For example, I may use a monoacid monoamide of an unsaturated polycarboxylic acid containing a

grouping and in which the carboxylic groups are attached to different carbon atoms, many specific examples of which are given in my copending application Serial No. 326,056.

Other examples of semi-amides that may be used are malonic monoacid monoamide, succinic monoacid monoamide, itaconic monoacid monoamide, maleic monoacid monoamide, adipic monoacid N-methyl monoamide, maleic monoacid N-phenyl monoamide, fumaric monoacid N-furfuryl monoamide, tartaric monoacid N-ethyl monoamide, phthalic monoacid N-cresyl monoamide, monoacid polyamides of polycarboxylic acids containing at least three carboxyl groups, e. g., citric monoacid diamide, aconitic monoacid diamide, tricarballylic monoacid diamide, etc., polyacid monoamides of polycarboxylic acids containing at least three carboxyl groups, e. g., citric diacid monoamide, aconitic diacid monoamide, tricarballylic diacid monoamide, etc.

In producing these new compositions comprising a condensation product of a plurality of compounds including a urea, an aliphatic aldehyde and the herein-described semi-amide, the initial condensation may be carried out at normal or at elevated temperatures and in the presence or absence of an acid or an alkaline condensing agent or catalyst. Preferably the reaction between the components is started under alkaline conditions. As the semi-amide reactant I prefer to use an acid amide containing at least one —COOH radical and at least one —CONH₂ radical.

Any substance yielding an alkaline aqueous solution may be used in obtaining alkaline conditions for the initial condensation reaction. For example, I may use an alkali such as sodium, potassium and calcium hydroxides, sodium and potassium carbonates, also tri-amines, for instance tri-alkanol amines, e. g., tri-isopropanol amine, tri-alkyl amines, e. g., tri-methyl, tri-ethyl, tri-propyl, tri-isopropyl, tri-butyl, etc., amines, tri-aryl amines, e. g., tri-phenyl amine, etc. Advantageously I introduce into the reaction mass a nitrogen-containing compound selected from the class consisting of ammonia (which includes within its meaning an aqueous solution of ammonia, specifically ammonium hydroxide), monoamines and diamines. Such nitrogen-containing compounds may be described as alkaline methylol-forming reagents and condensing agents. They are capable of inter-condensing with other components of the reaction mass, e. g., formaldehyde, or with products formed during the resin-forming reaction, e. g., methylol urea. On the other hand, when tri-amines such as trialkyl and tri-aryl amines are employed they are, to the best of my knowledge and belief, incapable of intercondensing with the other components. Examples of monoamines and diamines are the mono- and di-alkyl amines, e. g., the mono- and di-methyl, -ethyl, -propyl, -isopropyl, -butyl, -amyl, etc., amines, the mono- and di-aryl amines, e. g., mono- and di-phenyl amines, etc., the mono- and di-alkanol amines, e. g., mono- and di-ethanol amines, etc.

Various ways may be employed for effecting reaction between the components. For example, I may first mix all the reactants and effect condensation between the mixed reactants in the presence or absence of addition agents, for instance condensation catalysts, fillers, other natural or synthetic resinous bodies, solvents, diluents, etc. Alternatively, and for convenience in describing the methods I mention a urea as illustrative of the amidogen compound used as a primary reactant, I may add the semi-amide to a partial condensation product of a urea and an aliphatic aldehyde and effect further condensation between the components. Or, I may condense or partially condense the semi-amide with an excess of aliphatic aldehyde, add a urea to this condensation product and effect further reaction between the components. Or, I may separately partially condense (1) a urea and an aliphatic aldehyde and (2) a semi-amide and an aliphatic aldehyde, thereafter mixing the two products of partial condensation and effecting further condensation therebetween. Still other ways may be employed in combining the components and in producing the unmodified and modified condensation products of this invention, as will be readily understood by those skilled in the art as the description of the invention proceeds. These condensation reactions may proceed under a variety of time, temperature and pressure conditions. The temperature of the reaction may vary from room temperature to the reflux temperature of the reactants at reduced, atmospheric or super-atmospheric pressures.

The products obtained as described above properly may be designated as intermediate condensation products. They are thermosetting resinous bodies which alone or mixed with fillers, pigments, dyes, lubricants, etc., may be used, for example, as molding compositions. The modified and unmodified resinous masses are self-convertible at elevated temperatures to an insoluble, infusible (that is, cured) state.

These intermediate condensation products may be concentrated or diluted further by the addition or removal of volatile solvents to form liquid coating compositions of adjusted viscosity and concentration. The liquid products may be used, for instance, as surface-coating materials, in the production of paints, varnishes, lacquers, enamels, etc., for general adhesive applications, as anticreasing agents, in the production of laminated articles and for numerous other purposes. The liquid intermediate condensation products also may be used directly as casting resins. Those intermediate products of a gel-like nature may be dried and granulated to form clear, unfilled, heat convertible resins.

In order that those skilled in the art better may understand how the present invention may be carried into effect, the following illustrative examples thereof are given. All parts are by weight.

Example 1

| | Parts |
|---|---|
| Urea | 60.0 |
| Aqueous formaldehyde (approximately 37.1% HCHO) | 161.0 |
| Citric monacid diamide | 1.0 |

The above components were intercondensed by heating to the temperature of boiling of the mixed reactants, yielding a resinous syrup which cured rapidly to an insoluble, infusible state when a small sample of it was heated on a 130° C. hot plate.

Example 2

| | Parts |
|---|---|
| Urea | 60.0 |
| Aqueous formaldehyde (approximately 37.1% HCHO) | 161.0 |
| Aqueous ammonia (approximately 28% NH₃) | 7.1 |
| Sodium hydroxide in 10 parts water | 0.623 |
| Citric monoacid diamide | 1.75 |

All of the above components with the exception of the citric monoacid diamide were mixed and heated under reflux for 2½ hours, then dehydrated under vacuum until the reaction mass contained approximately 66 per cent solid resin. The citric monoacid diamide was then added and intercondensed with the urea-formaldehyde partial condensation product for 3 hours at room temperature. The resulting resin cured rapidly to a hard, insoluble, infusible state when a small sample of it was heated on a 130° C. hot plate. In the absence of the citric monoacid diamide, a non-curing resin was obtained.

Example 3

| | Parts |
|---|---|
| Melamine | 63.0 |
| Aqueous formaldehyde (approximately 37.1% HCHO) | 140.0 |
| Aqueous ammonia (approximately 28% NH₃) | 3.0 |
| Sodium hydroxide in 15 parts water | 0.06 |
| Citric monacid diamide | 0.1 |

All of the above components with the exception of the citric monoacid diamide were mixed and heated under reflux for 10 minutes. At the end of this period of time the semi-amide was added and the mass was brought to boiling. The hot resin syrup was mixed with 67 parts alpha flock and 0.4 part zinc stearate (mold lubricant) to form a molding composition. The wet compound was air dried at room temperature for 18 to 20 hours. Portions of the dried compound were molded for 3 minutes at 130° C. under a pressure of 2000 pounds per square inch. The molded articles could be removed hot from the mold without distortion. They were well cured and of excellent color. Further, they were not noticeably attacked when immersed for 15 minutes in boiling water. Molded articles similarly made from compounds in which the citric monoacid diamide was omitted from the resin formulation disintegrated when immersed for 15 minutes in boiling water.

The following examples illustrate the production of resinous compositions wherein additional reactants, specifically an acetoacetic ester and a malonic ester, are intercondensed with the other reactants to become an integral part of the resin molecule.

Example 4

A liquid resin was prepared by heating the following components under reflux for 15 minutes:

| | Parts |
|---|---|
| Melamine | 113.2 |
| Aqueous formaldehyde (approximately 37.1% HCHO) | 280.0 |
| Aqueous ammonia (approximately 28% NH₃) | 6.0 |
| Sodium hydroxide in 12 parts water | 0.12 |
| Diethyl malonate | 21.6 |

To this liquid resin was added 2 per cent by weight of the whole of citric monoacid diamide and caused to intercondense therewith. The resulting resin cured rapidly to an insoluble, infusible state when a small sample of it was worked on a 135° hot plate.

Example 5

| | Parts |
|---|---|
| Urea | 57.0 |
| Aqueous formaldehyde (approximately 37.1% HCHO) | 161.0 |
| Aqueous ammonia (approximately 28% NH₃) | 7.6 |
| Sodium hydroxide in 10 parts water | 0.04 |
| Diethyl malonate | 8.0 |
| Citric monoacid diamide | 0.3 |

All of the above components with the exception of the citric monoacid diamide were mixed and heated under reflux for 30 minutes. At the end of this reaction period the semi-amide was added and the liquid mass was heated to boiling, followed by cooling to room temperature. The cooled resin syrup was mixed with 70 parts alpha flock and 0.4 part zinc stearate to form a molding compound. The wet compound was dried at 70° C. for 2¾ hours. Molded articles produced by molding portions of the dried compound for 3 minutes at 130° C. under a pressure of 2000 pounds per square inch were well cured and showed good plastic flow during molding. The molded pieces could be pulled hot from the mold without distortion.

Example 6

| | Parts |
|---|---|
| Urea | 57.0 |
| Aqueous formaldehyde (approximately 37.1% HCHO) | 161.0 |
| Aqueous ammonia (approximately 28% NH₃) | 6.0 |
| Sodium hydroxide in 10 parts water | 0.04 |
| Ethyl acetoacetate | 5.5 |
| Citric monoacid diamide | 0.3 |

The same procedure was followed in making the resin syrup, molding compound and molded articles as described under Example 5 with the exception that the time of drying the wet compound was 2½ hours and the molding time was only 2 minutes. The molded articles were hard, well cured throughout and could be pulled hot from the mold without distortion.

Instead of ethyl acetoacetate in a formulation such as above given by way of example, any other keto-ester represented by the formula RCOCH₂COOR', where R and R' are hydrocarbon radicals, may be employed. Numerous examples of such keto-esters are given in my copending application Serial No. 354,395, filed August 27, 1940, and assigned to the same assignee as the present invention. Numerous examples of malonic esters that may be used instead of diethyl malonate in formulations such as exemplified by Examples 4 and 5 are given in my copending application Serial No. 346,962, filed July 23, 1940, and likewise assigned to the same assignee as the present invention.

The ratio of the reactants to each other may be considerably varied but, in general, it is desirable to use at least one mol of an aliphatic aldehyde for each mol of mixed (total) urea substance or equivalent material and semi-amide. Good results are obtained by using at least 1½ mols (e. g., from 1¾ to 5 or 6 mols or more) of an aliphatic aldehyde, specifically formaldehyde, for each mol of total urea substance or other amidogen compound and semi-amide. Approximately 2 to 3 mols aliphatic aldehyde per mol total urea substance or equivalent material and semi-amide usually give very satisfactory results, particularly from the viewpoint of optimum yield of condensation product per unit cost.

The amount of the semi-amide may be widely varied as desired or as conditions may require, but in most cases the proportion is within the range of 0.01 to 0.35 mol semi-amide per mol urea substance or other amidogen compound. Not exceeding substantially ¼ mol of the semi-amide for each mol of urea substance or equivalent material often is used. Thus, excellent heat-convertible molding compositions are produced by suitably incorporating a filler into a soluble, fusible resinous condensation product of the components of a mass comprising one mol of urea (or a total of one mol of urea and another amidogen compound, e. g., an aminotriazine such as ammeline, melamine, etc.), at least 1½ mols, advantageously 1¾ to 2½ mols, of an aliphatic aldehyde, specifically formaldehyde, and not exceeding substantially ¼ mol of the hereindescribed semi-amide. No advantage ordinarily accrues from using an amount of semi-amide above the minimum required to secure the desired curing effect.

The fundamental resins of this invention may be varied widely by introducing other modifying bodies before, during or after effecting condensation between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; monoamides such as formamide, acetamide, stearamide, acrylamide, benzamide, toluene sulfonamide, etc.; polyamides such as adipic diamide, phthalamide, and the like; amines such as ethylene diamine, aniline, phenylene diamine, aminophenols, etc.

The modifying bodies also may take the form of high molecular weight bodies with or without resinous characteristics, for example hydrolyzed wood products, lignin, proteins, protein-aldehyde condensation products, furfural condensation products, phenol-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetate, polyvinyl acetals, specifically polyvinyl formal, synthetic linear condensation products such as the superpolyamides, etc.

Dyes, pigments and opacifiers may be incorporated into the compositions to alter the visual appearance and the optical properties of the finished product. If needed, mold lubricants may be added to facilitate molding of the heat-convertible molding compositions. Fillers, e. g., alpha cellulose in flock form, asbestos, sand, mica, wood flour, etc., may be added to obtain a wide variety of molding compositions and molded articles adapted to meet particular conditions. Other effect agents also may be added as desired or as conditions may require.

In the preparation of molding compositions, the non-dehydrated or the partially dehydrated condensation products may be compounded with the modifying agents in accordance with procedures well known to those skilled in the plastics art. The wet compositions may be dried in the usual manner at normal (room) temperature or at elevated temperature in a preheated stream of air or under the influence of reflected heat energy. The dried compounds may be densified through the usual processes of working in a Banbury mixer or by rolling, pelletting or other means, followed by grinding and screening to the desired particle size. These molding compositions may be molded at elevated temperatures, preferably between 100° and 150° C., and at suitable pressures. The molding pressures generally range between about 1000 and 4000 pounds per square inch.

In addition to their use in molding compositions, the condensation products of this invention may be used as fire retardants, water-repellents, sizings, as impregnants for electrical coils, and for other purposes. Thus, they may be used in these and other applications as described in my copending application Serial No. 288,034, filed August 2, 1939, now Patent No. 2,214,851, issued September 17, 1940, and assigned to the same assignee as the present invention, namely, in making protective-surfacing materials, for example paints, varnishes, etc., in making arc-extinguishing tubes capable of evolving an arc-extinguishing gas under the heat of the arc, in the production of wire or baking enamels, for bonding or cementing together mica flakes to form a laminated mica article, and as anti-creasing agents.

What I claim as new and desire to secure by Letters Patent of the United States is:

1. A composition comprising a heat-curable aminoplast having intercondensed therein a simple, partial amide of a polycarboxylic acid that contains at least three and not more than fifteen carbon atoms, said partial amide containing a —COOH radical and an amide radical having a hydrogen atom attached directly to the amide nitrogen.

2. A product comprising a heat-cured aminoplast having intercondensed therein a simple, partial amide of a polycarboxylic acid that contains at least three and not more than fifteen carbon atoms, said partial amide containing a —COOH radical and an amide radical having a hydrogen atom attached directly to the amide nitrogen.

3. A composition comprising a condensation product of a plurality of compounds including a urea, an aliphatic aldehyde and a simple, partial amide of a polycarboxylic acid that contains at least three and not more than fifteen carbon atoms, said partial amide containing a —COOH radical and an amide radical having a hydrogen atom attached directly to the amide nitrogen.

4. A composition comprising a heat-convertible aminoplast having intercondensed therein a simple, partial amide of a polycarboxylic acid that contains at least six and not more than fifteen carbon atoms, said partial amide containing a —COOH radical and an amide radical having a hydrogen atom attached directly to the amide nitrogen.

5. A composition comprising a heat-curable aminoplast having intercondensed therein a partial amide of citric acid, said amide containing at least one —COOH radical and at least one —CONH₂ radical.

6. A composition comprising a heat-curable aminoplast having intercondensed therein a monoamide of adipic acid, said monoamide having a hydrogen atom attached directly to the amide nitrogen.

7. A composition comprising a heat-curable aminoplast having intercondensed therein a monoamide of phthalic acid, said monoamide having a hydrogen atom attached directly to the amide nitrogen.

8. A condensation product of a plurality of compounds including urea, formaldehyde and a simple, partial amide of a polycarboxylic acid that contains at least three and not more than fifteen carbon atoms, said partial amide containing a —COOH radical and a —CONH₂ radical.

9. A condensation product of a plurality of compounds including melamine, formaldehyde and a simple, partial amide of a polycarboxylic acid that contains at least three and not more than fifteen carbon atoms, said partial amide containing a —COOH radical and a —CONH₂ radical.

10. A condensation product of a plurality of compounds including urea, melamine, formaldehyde and a simple, partial amide of a polycarboxylic acid that contains at least three and not more than fifteen carbon atoms, said partial amide containing a —COOH radical and a —CONH₂ radical.

11. A composition comprising the product of reaction, in the presence of an alkaline substance, of a plurality of compounds including a urea, an aliphatic aldehyde and a simple, partial amide of a polycarboxylic acid that contains at least three and not more than fifteen carbon atoms, said partial amide containing a —COOH radical and an amide radical having a hydrogen atom attached directly to the amide nitrogen.

12. A composition comprising a condensation product of a plurality of compounds including a urea, an aliphatic aldehyde, a nitrogen-containing compound selected from the class consisting of ammonia, monoamines and diamines, and a simple, partial amide of a polycarboxylic acid that contains at least three and not more than fifteen carbon atoms, said partial amide containing a —COOH radical and a —CONH₂ radical.

13. A composition comprising a resinous condensation product of a plurality of compounds including urea, formaldehyde and citric monoacid diamide.

14. A composition comprising a resinous condensation product of a plurality of compounds including urea, melamine, formaldehyde and citric monoacid diamide.

15. A composition compirsing a resinous condensation product of a plurality of compounds including melamine, formaldehyde and a monoamide of adipic acid, said monoamide having a hydrogen atom attached directly to the amide nitrogen.

16. A product comprising an insoluble and infusible resinous condensation product of a plurality of compounds including a urea, formaldehyde and a simple, partial amide of a polycarboxylic acid that contains at least three and not more than fifteen carbon atoms, said partial amide containing a —COOH radical and an amide radical having a hydrogen atom attached directly to the amide nitrogen.

17. A heat-hardenable molding composition comprising a filler and a soluble, fusible resinous product of reaction of ingredients including urea, formaldehyde and a simple, partial amide of a polycarboxylic acid that contains at least three and not more than fifteen carbon atoms, said partial amide containing a —COOH radical and a —CONH₂ radical.

18. An article of manufacture comprising the heat-hardened molding composition of claim 17.

19. The method of preparing new condensation products which comprises effecting reaction between ingredients including a urea, an aliphatic aldehyde and a simple, partial amide of a polycarboxylic acid that contains at least three and not more than fifteen carbon atoms, said partial amide containing a —COOH radical and an amide radical having a hydrogen atom attached directly to the amide nitrogen.

20. A composition of matter comprising a product of reaction of ingredients including an amidogen compound and an aliphatic aldehyde, said reaction product having intercondensed therein a simple, partial amide of a polycarboxylic acid that contains at least three and not more than fifteen carbon atoms, said partial amide containing a —COOH radical and an amide radical having a hydrogen atom attached directly to the amide nitrogen.

21. A composition comprising the product of intercondensation of a plurality of compounds including an alcohol, a urea, an aliphatic aldehyde and a simple, partial amide of a polycarboxylic acid that contains at least three and not more than fifteen carbon atoms, said partial amide containing a —COOH radical and an amide radical having a hydrogen atom attached directly to the amide nitrogen.

GAETANO F. D'ALELIO.

CERTIFICATE OF CORRECTION.

Patent No. 2,377,866. June 12, 1945.

GAETANO F. D'ALELIO.

It is hereby certified that error appears in the printed specification of the above numbered patent requiring correction as follows: Page 1, first column, line 14, for "containg" read --containing--; line 29, for "designed" read --designated--; line 34, after "Patent" insert --No.--; line 37, for the serial number "159,465" read --169,465--; page 2, first column, line 59, for "compgositions" read --compositions--; and second column, line 65, for "cylohexane" read --cyclohexane--; page 4, first column, lines 10 and 50, for "monacid" read --monoacid--; and second column, line 21, after "135°" insert --C.--; page 6, second column, line 9, for "compirsing" read --comprising--; and that the said Letters Patent should be read with this correction therein that the same may conform to the record of the case in the Patent Office.

Signed and sealed this 11th day of September, A. D. 1945.

Leslie Frazer (Seal)   First Assistant Commissioner of Patents.